United States Patent [19]

Booth

[11] 4,016,299

[45] Apr. 5, 1977

[54] PROCESS OF COATING FOOD WITH PARTICULATE MATERIAL

[75] Inventor: Raymond E. Booth, Sandusky, Ohio

[73] Assignee: Sam Stein Associates, Inc., Sandusky, Ohio

[22] Filed: Dec. 12, 1975

[21] Appl. No.: 640,235

Related U.S. Application Data

[63] Continuation-in-part of Ser. No. 544,323, Jan. 27, 1975, Pat. No. 3,967,583.

[52] U.S. Cl. .............................................. 426/293
[51] Int. Cl.$^2$ ........................................... A23L 1/00
[58] Field of Search ........................... 426/289, 293

[56] References Cited

UNITED STATES PATENTS

| | | | |
|---|---|---|---|
| 3,881,029 | 4/1975 | Arenson | 426/289 |
| R24,835 | 6/1960 | Christianson et al. | 426/289 |

*Primary Examiner*—Raymond N. Jones
*Attorney, Agent, or Firm*—Baldwin, Egan, Walling & Fetzer

[57] ABSTRACT

A method is presented of coating a food product with a finely divided particulate coating material comprising the steps of providing a flow of said coating material to a moving belt which provides a product path centrally thereof; splitting said flow and providing a bed of said material of predetermined thickness on a central portion of said product path while diverting parts of said material flow laterally on both sides of said central portion; placing a food product on said central portion; advancing said product and said coating material down said path; and discharging said coated product at the end of said path. The method also includes the additional steps of moving the laterally diverted parts of material flow laterally inwardly on top of the food product on the central portion of the product path, and assisting excess coating material under and around the product to return to circulation.

3 Claims, 35 Drawing Figures

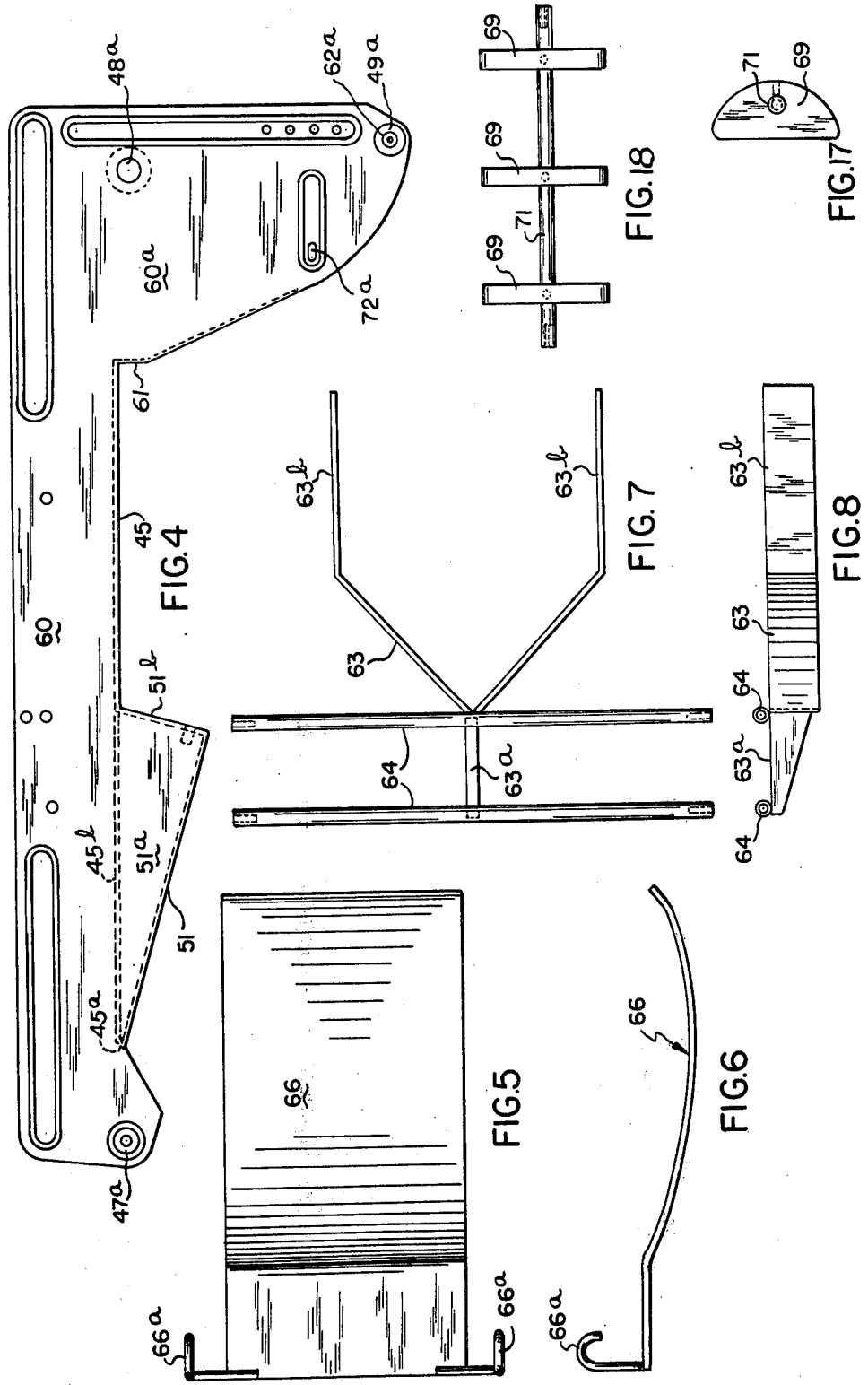

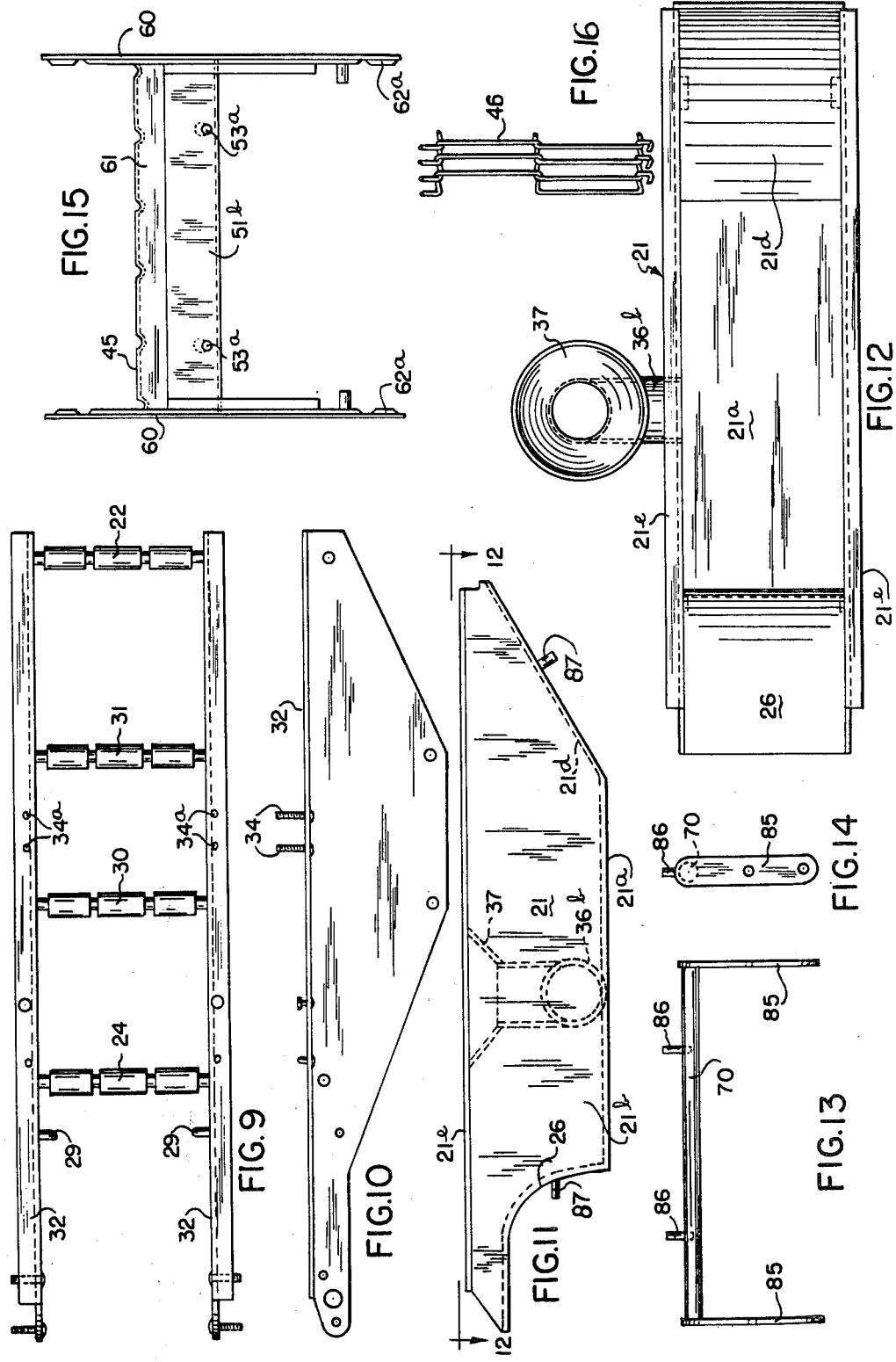

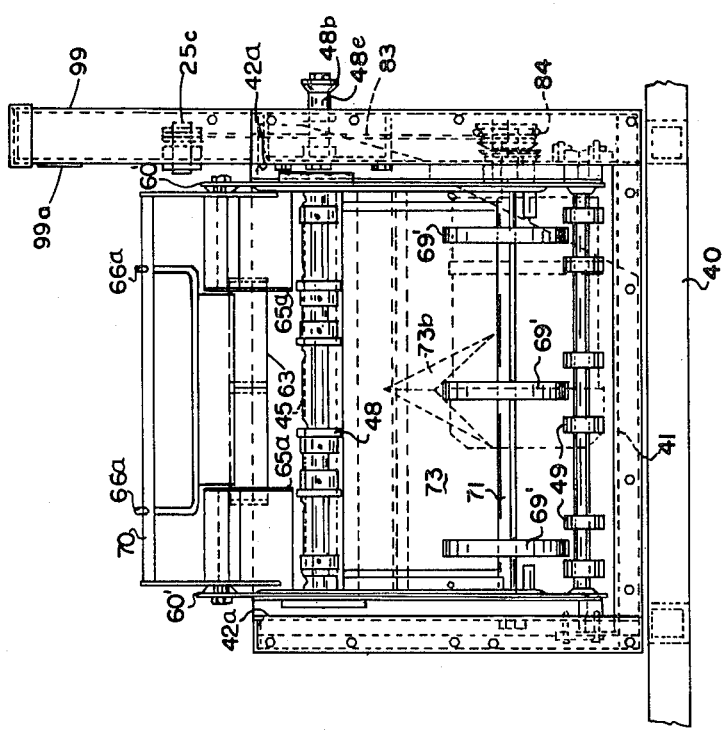
FIG. 22
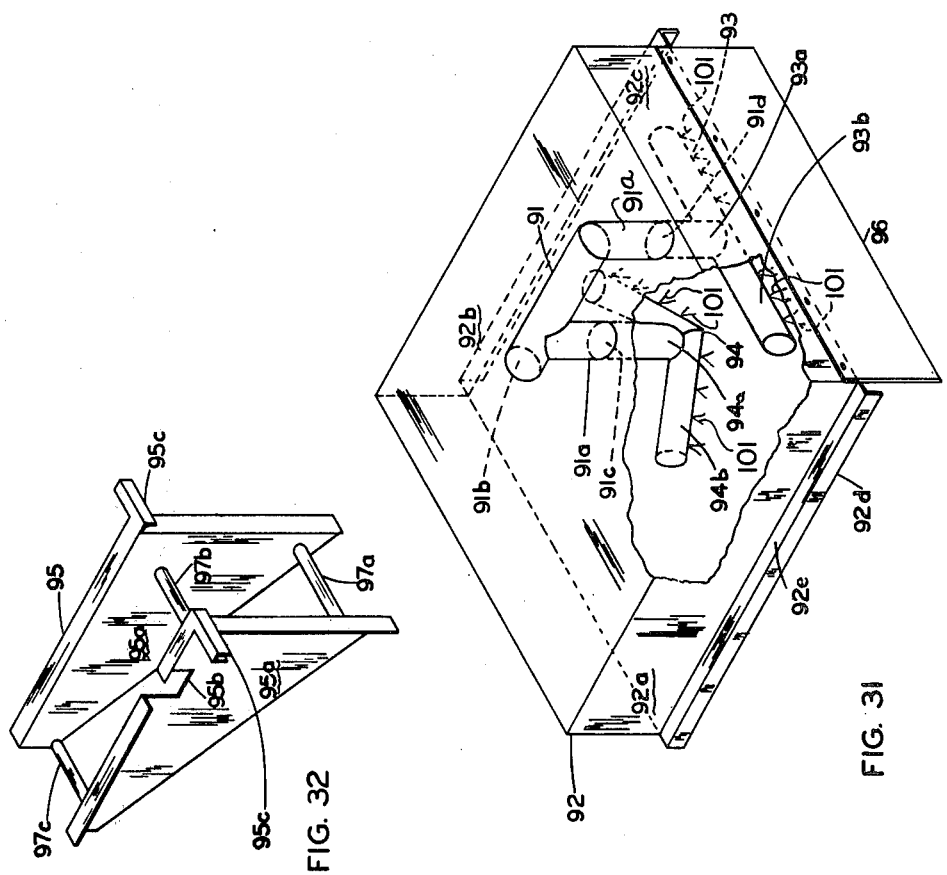
FIG. 31
FIG. 32

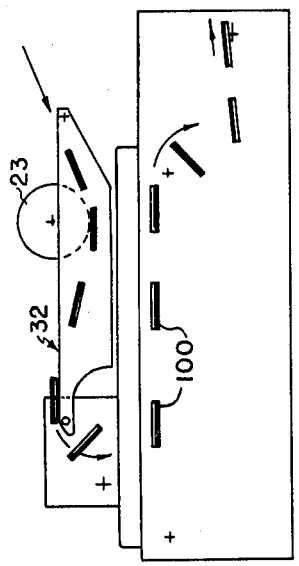
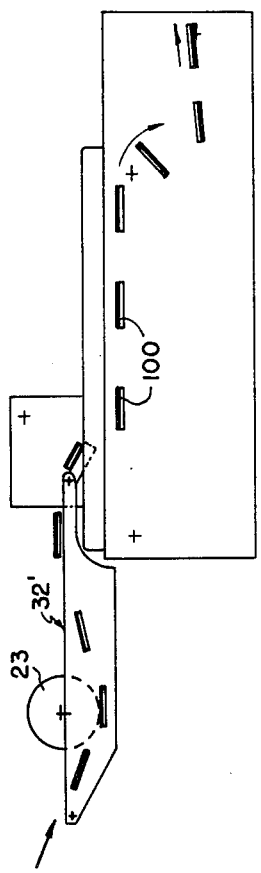
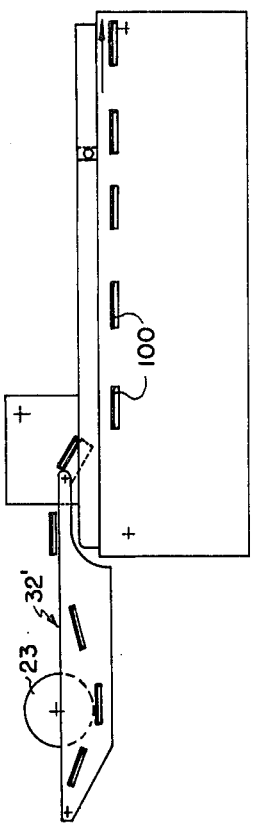
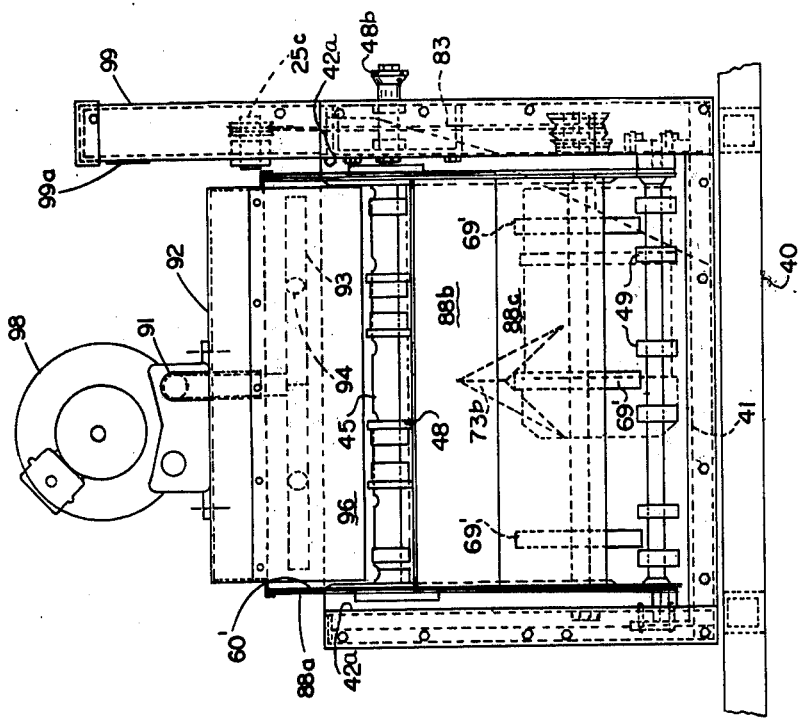

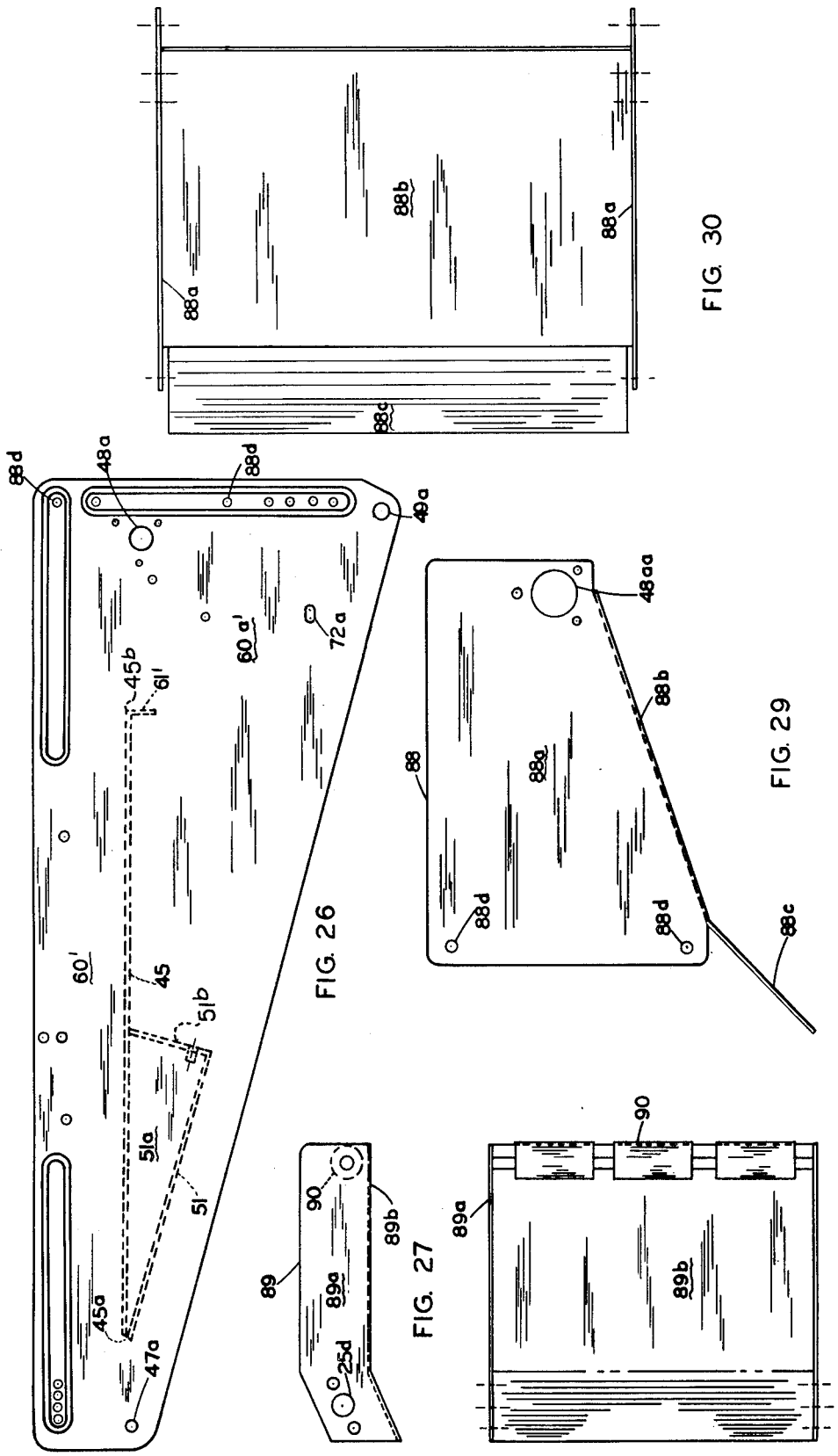

PROCESS OF COATING FOOD WITH PARTICULATE MATERIAL

BACKGROUND OF THE INVENTION

This application is a continuation-in-part of my co-pending application Ser. No. 544,323, filed Jan. 27, 1975 now U.S. Pat. No. 3,967,583. The disclosures of said application are incorporated herein and may be referred to for a better understanding of this invention, if necessary.

Among the objects of the present invention are included the provision in a breading unit of a single layer of dry breading material which is controlled so as to form both a receiving bread layer for the product and, in most forms, a top cover for the product; to maintain dry breading material levels for a period of time by means of a built-in hopper; to pump the dry coating material from the hopper through a slot which provides sufficient pressure to force the dry material upwardly through an open wire mesh conveyor belt to the breading run; to treat the dry coated product in a manner to remove most of the excess dry coating material; to transfer the coated product out of the breading machine; and to return the excess dry breading material back to the hopper.

Other objects and advantages of the invention will be apparent from the accompanying drawings and description and the essential features will be summarized in the claims.

In the drawings,

FIG. 4 is a side elevational view of one of two parallel vertical conveyor support plates positioned on opposite sides of the flexible wire mesh conveyor belt of the breading unit;

FIGS. 5 and 6 are respectively top plan and side elevational views of a tamper plate seen in broken lines at the upper mid-portion of FIG. 1;

FIGS. 7 and 8 are respectively top plan and side elevational views of the splitter seen at the left end of FIG. 2;

FIGS. 9 and 10 are respectively top plan and side elevational views of the conveyor belt frame used in the liquid-coating unit;

FIGS. 11 and 12 are respectively side elevational and top plan views of the batter reservoir of the liquid-coating unit;

FIGS. 13 and 14 are respectively side elevational and end views of the batter tank supports which hold the batter reservoir in position above the breading-coating unit;

FIG. 15 is an end view of a conveyor frame comprising two of the support plates shown in FIG. 4;

FIG. 16 is an enlarged view of the open mesh flexible wire belt described herein;

FIGS. 17 and 18 are respectively end and side elevational views of the belt reverser members;

FIG. 22 is an end view of the same taken from the right-hand side of FIG. 20;

FIG. 25 is an end view of the same taken from the right-hand side of FIG. 23;

FIG. 26 is a side elevational view of an alternate form of vertical conveyor support plates positioned on either side of the flexible wire mesh conveyor belt of the breading unit;

FIG. 27 is a side elevational view of the batter-coating unit conveyor frame extension used in the second and third embodiments of the invention;

FIG. 28 is a top plan view of FIG. 27;

FIG. 29 is a side elevational view of an extension frame for the dry breading material conveyor belt for the third embodiment of the invention;

FIG. 30 is a top plan view of FIG. 29;

FIG. 31 is a perspective view of the breading blowoff housing as used in the third embodiment of the invention;

FIG. 32 is a perspective view of the in-feed bracket used to support the batter-coating unit in the second and third embodiments of the invention;

FIG. 33 is a side elevational diagrammatic view showing the product path through the preferred form of the invention as illustrated in FIG. 1;

FIG. 34 is a side elevational diagrammatic view showing the product path through the second embodiment of the invention as illustrated in FIG. 20; while FIG. 35 is a side elevational diagrammatic view showing the product path through the third embodiment of the invention as illustrated in FIG. 23.

A preferred form of the open mesh flexible wire conveyor belt used in this invention, and shown in FIG. 16, is one made under the trade name "Flat-Flex" by the Wire Belt Company of America. Other similar conveyor belts may be suitable for use in this invention.

Figure 1:
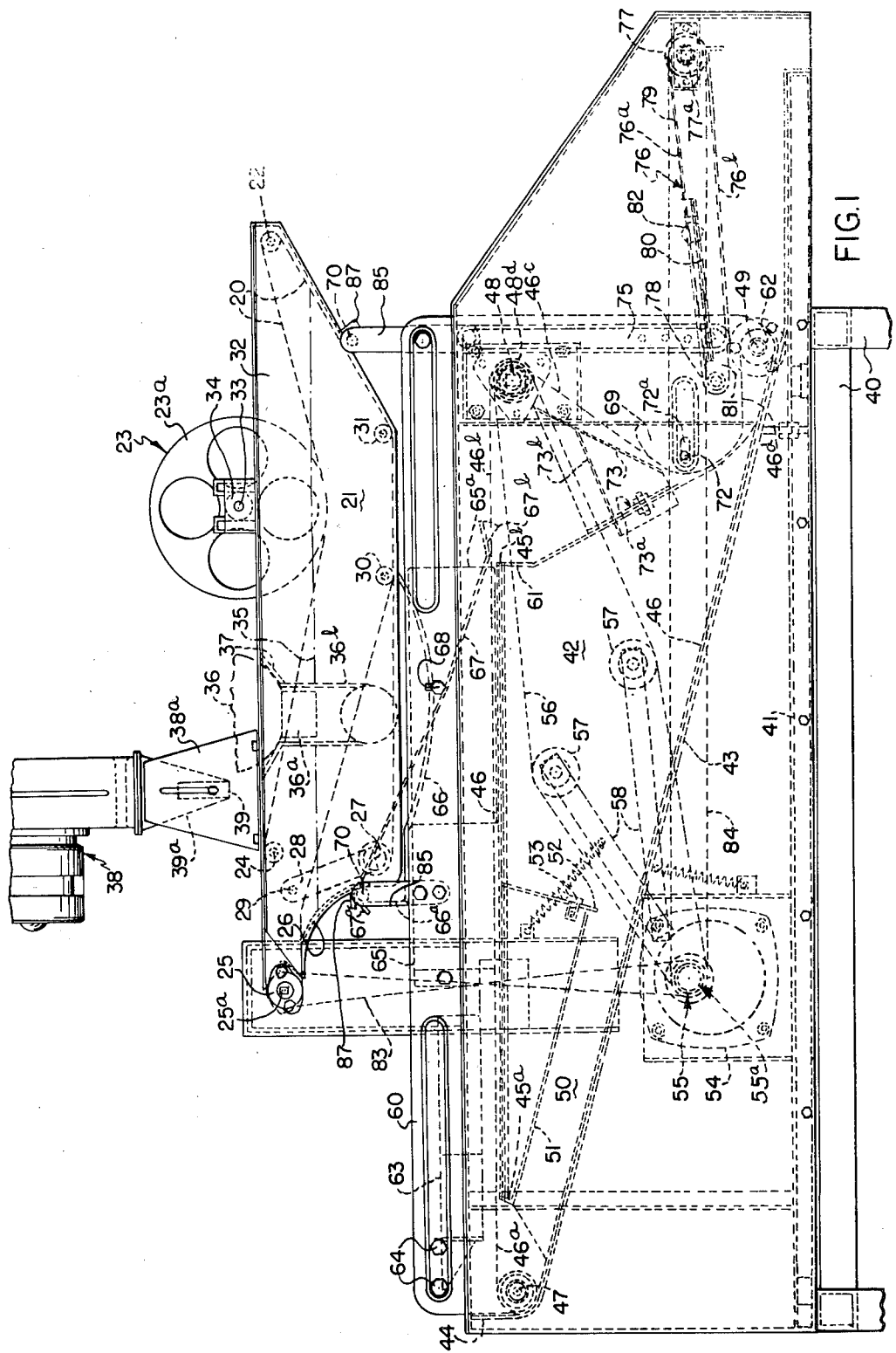
FIG. 1 is a side elevational view of the liquid-coating unit removably supported above the dry-coating unit in a preferred form of the invention.
Figure 2:
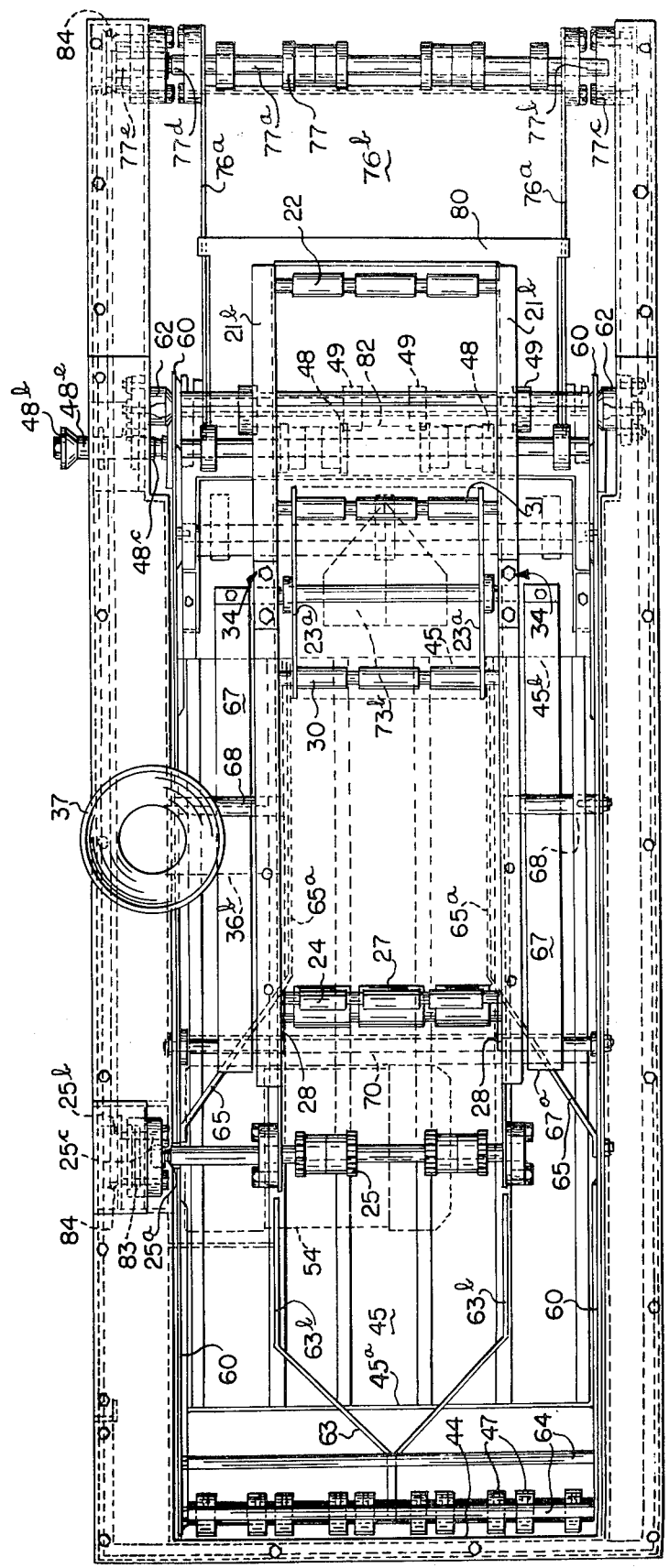
FIG. 2 is a top plan view of FIG. 1.
Figure 3:
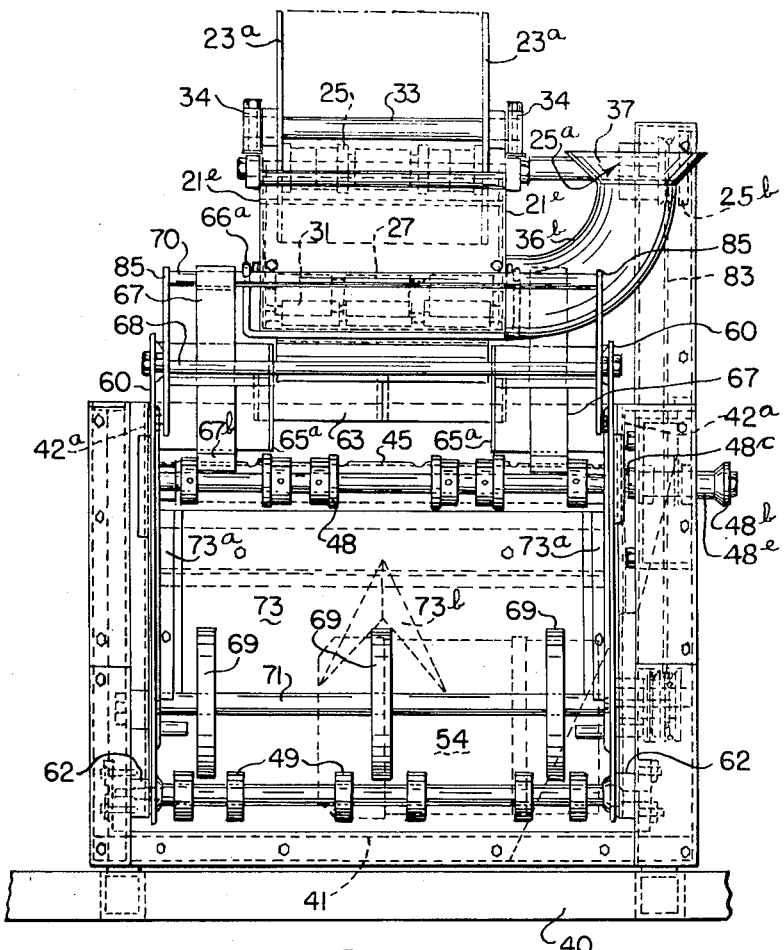
FIG. 3 is an end view taken from the right-hand end of FIG. 1.
Figure 19:
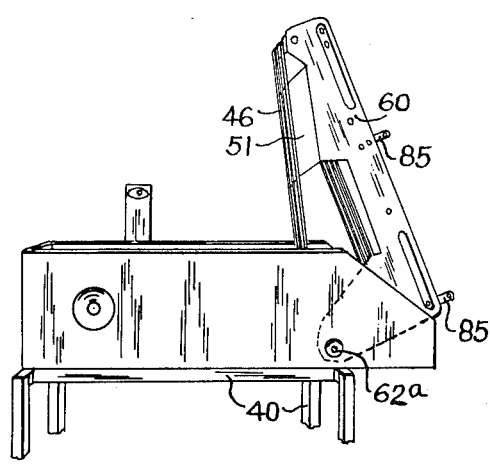
FIG. 19 is a small perspective view showing the side frame support members 60 and attached parts tilted around pivots 62 for cleaning and inspection.

The dry coating unit used in this method is best understood from FIGS. 1, 2 and 3. A stand 40 supports a base plate 41, on which rests all parts of the breading machine unit now to be described. Briefly, this structure includes a breading material storage hopper 42 having an inclined bottom 43 between two parallel vertical side walls 42a, a short end wall 44 and a partial top wall comprising a slider plate 45 which is generally flat and horizontal. A continuous open mesh wire conveyor belt 46 has a breading material elevating run traveling upwardly toward the left as viewed in FIG. 1 close to the inclined bottom wall 43, then passing over an idler pulley equivalent 47, then horizontally in a product-advancing run horizontal and close to the slider plate 45, then over drive pulley 48 and then dowardly on a transfer run around belt reverser 69 and over an idler pulley equivalent 49, near the product-take-away point, and then turning upwardly on the elevating run again.

One of the novel features of this invention is the "pumping" slot indicated at 50. This slot is enclosed by a roof 51 which is spaced above and parallel to the slanting bottom wall 43, and has as side walls the two side walls of the hopper 42. The opposite ends of the slot are open and the roof 51 is connected by side walls 51a to the slider plate 45 as seen in FIG. 4 and the right-hand end of the plates 51 and 51a, as seen in FIGS. 1 and 4, is closed by a plate 51b. The height of the slot 50 is preferably approximately one and one-half times the maximum thickness of breading material desired on the product receiving portion of the conveyor belt above the slider plate 45. Preferably also, means is provided for adjusting the effective height of the slot which in the drawings includes a rectangular plate 52, seen in FIG. 1, which is adjustably held by one or more screw connections 53. The suitable height and length of slot 50 will be discussed later. The means for driving the belt 46 comprises an electrical motor 54 mounted on the base plate 41 and having a drive sprocket 55 which is connected by drive chain 56 with the drive sprocket 48d on stub shaft 48e.

The level of the breading material in the hopper 42 is normally above the entrance to the slot 50. The belt conveyor 46 traveling upwardly through the slot pumps the breading material upwardly to the pulley equivalent 47. The spacing between the periphery of this pulley and the hopper walls 43 and 44 is approximately the thickness of belt conveyor 46. The movement of belt 46 piles up the breading material against the pulley equivalent 47 and forces it upwardly through a breading entrance at 46a which is between the pulley equivalent 47 and the upstream end 45a of the slider plate. The breading material at this point wells up through the open mesh belt at 46a to a predetermined height as will presently appear.

Referring to FIGS. 1, 4 and 15, much of the operating structure of the breading machine is supported by a frame clearly shown in FIGS. 4 and 15. This includes as a unitary structure two parallel vertical conveyor support plates 60 which extend the full length of the product-advancing run of the belt conveyor 46. As clearly seen in FIG. 15, these support plates are connected rigidly by the slider plate 45, by a short vertical wall 61, by a short vertical wall at 45a and by the wall 51b. The openings 53a in the plate 51b are to receive the adjustment screws 53 which hold the slot height adjustment plate 52. Between the two support plates 60 are mounted the upstream pulley equivalent at the location 47a, the downstream drive pulley at the location 48a and a third pulley equivalent 49 at the location 49a. The additional breading material control members are mounted along the upper edge of the two vertical conveyor support plates 60 as described in the next paragraph.

Means is provided for splitting the upper portion of the flow of breading material which is pushed upwardly through the breading entrance in the upstream space at 46a. This means is a V-shape, bent bar splitter 63, best seen in FIGS. 2, 7 and 8. This structure diverges from a nose 63a which is welded to two support rods 64 which are rigidly secured crosswise between the support plates 60. The splitter has parallel trailing legs 63b extending in the direction of product travel from the respective ends of the V-shape member 63. The trailing legs of the splitter encompass a product travel path along the belt conveyor 46 which is wide enough to encompass the product intended to be coated and which is approximately half as long as the longest product intended to be coated. It will be noted in FIG. 8 that the lower edge of the splitter is planar and at the level of the desired thickness of breading material beneath the product on the product-advancing run of the conveyor belt 46.

It has been mentioned previously that the dry breading material wells up at 46a across the entire width of the conveyor belt 46. The splitter is in the central portion only of this path and diverts breading material laterally to each side above the level of the lower edge of the splitter. Means is provided for moving substantially all of the breading material on both sides of the product path including the material laterally diverted by the splitter 63, laterally inward from both sides onto the top of the product traveling along the conveyor belt 46. This means comprises two side plows 65, best seen in FIG. 2. One of these is on either side of the product path and each side plow has a converging portion extending from approximately a lateral edge of the slider plate 45 downstream and inwardly to approximately a colinear position with one of the splitter trailing legs 63b, and there is provided a trailer portion 65a extending downstream from the end of each plow parallel to the product path down to the product discharge end of the slider plate 45a. Each trailer portion 65a is rigidly supported from a support member 60 by a stub tube 68. Each of these plows has a height extending from slightly above the slider plate 45 to a level above the breading material to be spread laterally inwardly over the food product and which is carried by the belt conveyor on the product-advancing run and between the side plow trailer portions.

The trailing legs 63b of the splitter are approximately one-half of the length of the longest product intended to be coated but may vary from twenty percent to thirty percent with various designs of the machine. The ends of the splitter trailing legs 63b are approximately in the same cross sectional plane where the side plows 65 start to leave the sides of the main conveyor frame 60. Side plow trailing legs are long enough to provide a predetermined product dwell time in breading at the predetermined belt speed. In one embodiment, the dwell time is approximately 6 seconds at a belt conveyor speed of 15 feet per minute.

To insure full coverage of the food product, preferably a tamper plate 66, best seen in FIGS. 1, 5 and 6, is floated on top of the dry breading material in the product path. This plate is pivoted horizontally on its upstream edge so that it is free to follow any fluctuations in the dry breading material thickness. It is nominally as wide as the product path, with clearance so that it will freely float between the side plow trailer portion 65a. It is long enough to reach the trailing edge of the slider plate 45 at 45b. Its side elevation as seen in FIGS. 1 and 6 is such that the main pressure line on the dry breading material is usually less than about one-half its length from its pivot. The plate is here shown as pivoted on two hooks 66a which are rigidly secured to the upstream edge of the plate 66. As shown in FIG. 6, the major portion of the plate 66 is concave upwardly so that it floats smoothly on the breading material. The hooks 66a hang on a cross bar 70, seen in FIGS. 1, 13 and 14.

In the case of some flour coatings, which tend to bridge over the openings in the wire mesh conveyor 46, simple vibrators actuated by the passage of the conveyor 46 assist in its removal of excess dry breading material. As shown in FIGS. 1 and 2, two long flat vibrator blades 67 are provided, each with an integral bent portion on the upper end at 67a, which is hooked over cross bar 70. Each blade passes under a stub tube 68. This supports the vibrator blades in the inclined position shown in FIG. 1. The triangular block 67b rigidly fastened to the lower end of the blade 67 engages the cross wires of the conveyor belt 46 as they pass, and resultant vibration shakes the excess dry breading material through the belt 46 at breading exit 46b. Vibration effect may be increased or decreased by varying the shape of the blades before inserting them in the machine.

After passing over the drive pulley 48, the endless conveyor belt 46 turns downwardly approximately 120° over the drive pulley shaft, in the transfer run 46c. The belt then bends approximately 120° around a belt reverser shown in FIGS. 17 and 18. The belt 46 then has a short horizontal run 46d over to the pulley equivalent 49 where a 195° turn brings the belt conveyor 46 back to the breading material elevating run along the bottom of the bread hopper 42.

The material dropping through the conveyor belt 46 at the breading material exit 46b drops downwardly into the breading material hopper 42.

When the coated product reaches the drive pulley 48 it falls downwardly to a take-away point 75 indicated in FIG. 1, which is just above the pulley equivalent 49.

The drive motor 54 has previously been mentioned as being a reversible electrical motor which drives the motor sprocket 55 as clearly seen in FIG. 1. A drive belt 83 runs vertical upwardly from a drive pulley 55a on the motor shaft and passes around the drive pulley 25b mounted on the stub shaft 25c of the liquid battering unit as shown. Another drive belt 84 runs horizontally from a suitable drive pulley on the motor shaft to a drive pulley on stub shaft 77e to run the take-away conveyor 76.

It should now be noted that the dry breading material coating belt 46 may be reversed so as to empty the breading hopper 42 at the end of a day's run. During such an operation, the normally product-advancing run of conveyor belt 46 moves nearly all of the breading material on plate 45 back to the area 46a where it falls through the belt onto the elevating run, which at this time is reversed and carries the material downwardly along the inclined bottom 43 and out of the hopper 42 beneath and over the pulley equivalent 49 as seen in FIG. 1. In the embodiments shown in the drawings, only about 30 cubic inches of dry breading material remain in the bread tank after this self-emptying operation.

Referring to FIGS. 1, 13 and 14, in the use of the combined liquid coating and dry coating units as shown in FIGS. 1, 2 and 3, the liquid coating unit is held by similar structures at opposite ends of the batter reservoir tank 21.

It should now be clearly understood what the operation of the complete apparatus of this embodiment is. With the upper unit filled with batter to the level 35 and with the breading material hopper 42 filled with breading material beyond the point 52 at the entrance to slot 50, the motor 54 is actuated until breading material is spread along the slider plate 45 controlled by the splitter 63 and the side plows 65 as above described. Pieces of food product to be coated are then placed on the conveyor belt 20 inside of the batter reservoir 21 and the conveyor belt will than carry the food product to beneath the submerger wheel 23 and the air discharge slot 39 to fall over the pulley 25 onto the breading layer beneath the splitter 63. This fall is sufficient to cause the product to imprint itself somewhat into the uniform layer of breading material into which it falls. Then, as the product travels the path carried by the conveyor belt 46, the side plows 65 will spread the excess breading material laterally inwardly in both directions over the top of the product where the material will be flattened down and pressed into the product by the tamper plate 66. Then the excess breading material will fall through the conveyor belt at 46b, after which the product falls over the drive pulley 48 downwardly to the take-away conveyor 76 which carries it over the drive pulley 77 as a finished breaded product.

The liquid-batter coating unit will apply coatings varying from water thin to the thickness of heavy cream. The dry bread coating section will handle and apply finely divided dry materials including free flowing, granular and flour types, usually called "breading" by the trade. With slight modification, it will also handle granulated crystallized sugar, and other dry coatings.

Parts which may be coated by the described apparatus include fish portions and sticks and many fillets, most shrimp, cut-up chicken parts, meat patties, pork chops veal cutlets, as well as such as oysters, clams, scallops, doughnuts and other bakery items, etc.

The path shown in the drawings of this embodiment might be varied without effectively changing any of the machine functions. For instance, as shown in the second and third embodiments, the battering unit could be reversed around the drive pulley 25 so that the product advanced from left to right as seen in FIG. 1 through the battering unit, thence falling downward or passing smoothly to the breading unit and continuing in the same straight line to the finish. Other rearrangements of the units are possible by those skilled in the art.

The side plows might be eliminated for some products. The tamper plate is not always necessary, or could be replaced by a pressure roll or a spreader blade. The bread return deflector might be eliminated but this would require more frequent filling of the breading material hopper. The submerger wheel could be substituted by passing the conveyor 22 under a submerging bar.

As mentioned above, the height of the pumping slot 50 is preferably approximately 1½ times as great as the maximum thickness of breading material desired on the product receiving portion of the conveyor belt above the slider plate 45. Obviously there will be some slippage in the breading material during pumping, so that the multiplier to obtain pump slot height must be greater than one. The figure of 1½ is adequate for the described machine and is somewhat arbitrary. The length of the slot required to pump the desired amount of breading, once the slot height has been fixed, will vary according to the combination of several other factors. They are: The slope of the bottom wall 43 of hopper 42, the height of the end wall 45a at the inlet end of slider plate 45, the material and surface finish of the underside of slot roof plate 51, the spacing and diameter of the cross wires of the bread conveyor belt 46, and the constitution of the breading material itself. For each combination of the above, a slightly different slot length would be required. However, in constructing a simple machine as described, a variable slot length would be too costly. Therefore, the slot length is fixed at a length long enough to adequately pump most breading materials, which is 10 to 12½ inches in the machine described. Again obviously, this fixed length will be too long for some breading materials which pump easily due to their constitution of particles. In these cases, the slot as described will pump considerably more breading than is necessary or can be utilized on top of slider plate 45. The slot adjustment plate 52 provides a means for adjusting slot length by apparently adjusting slot height. When the slot adjustment plate 52 is lowered to reduce the opening at the inlet end of the slot, it restricts the amount of breading material entering the slot, and the upper surface of the bread layer does not touch the slot roof 51. If this condition remained throughout the slot length, there would be little pumping pressure at the outlet end of the slot to force breading upwardly through the belt 46 at 46a. However, the breading material then slips internally, backing up into the slot and filling the slot height. As the filling process continues down the slot length toward the inlet end of the slot, an increasing amount of breading is forced upward through the belt at 46a, until a steady state condition is reached, wherein the amount of breading being moved by the belt onto the slide plate 45 equals the amount entering the slot at 52. The slot length now in use is somewhat less than the original fixed length. This action could be seen through the transparent wall of a pilot model. In effect, the slot length has been shortened by reducing the slot height. When the use of a particular breading material is desired that will not pump adequately through the described slot, the slot length may be temporarily lengthened by bolting on a suitable slot extension plate, utilizing the belt positions 53a.

In discussing the second and third embodiments, as shown in FIGS. 20 through 35, parts which are the same as shown and described in the first embodiment have been given the same reference characters, sometimes with a "prime", and are further described only when necessary for a clear understanding.

Figure 20:
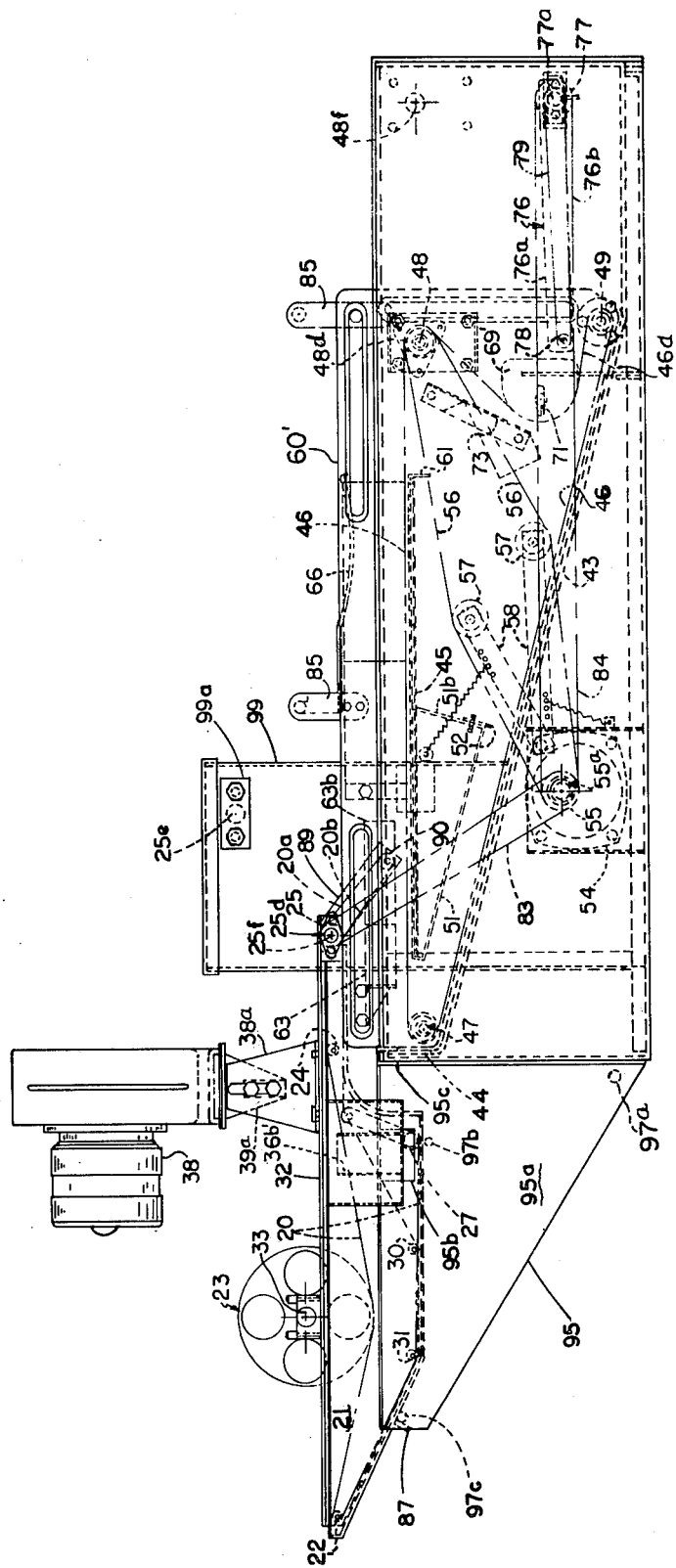
FIG. 20 is a side elevational view of a second embodiment of the invention showing the batter-coating unit removably supported at the in-feed end of the breading material coating unit.
Figure 21:
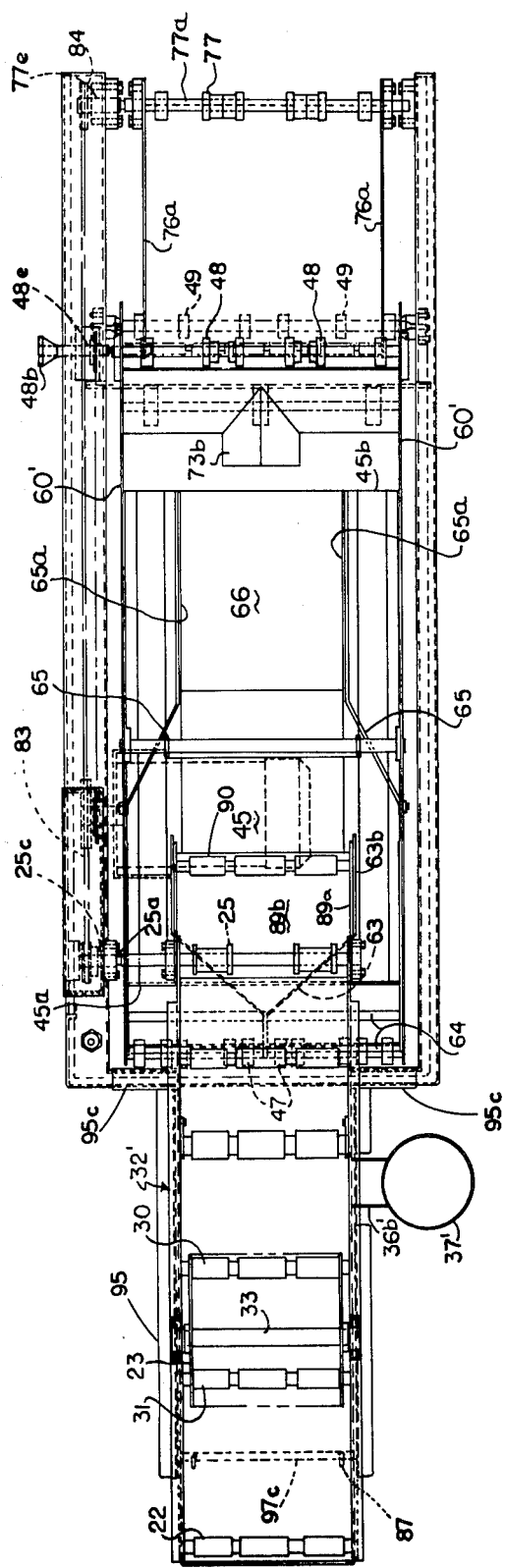
FIG. 21 is a top plan view of FIG. 20.

The chief change between FIG. 1 and FIG. 20 is that the liquid coating unit of FIG. 1 has been turned end for end in FIG. 20 with the discharge over drive pulley 25 nearer the level of conveyor run 46. New unit 95 (FIG. 32) supports the liquid coating unit, and unit 89 (FIGS. 27, 28) supports a short extension of conveyor belt 20.

In the drawings, FIGS. 20, 21, 22, 27, 28, 32 illustrate the parts additions necessary to convert from the preferred embodiment of FIG. 1 to the second embodiment in FIG. 20.

Figure 23:
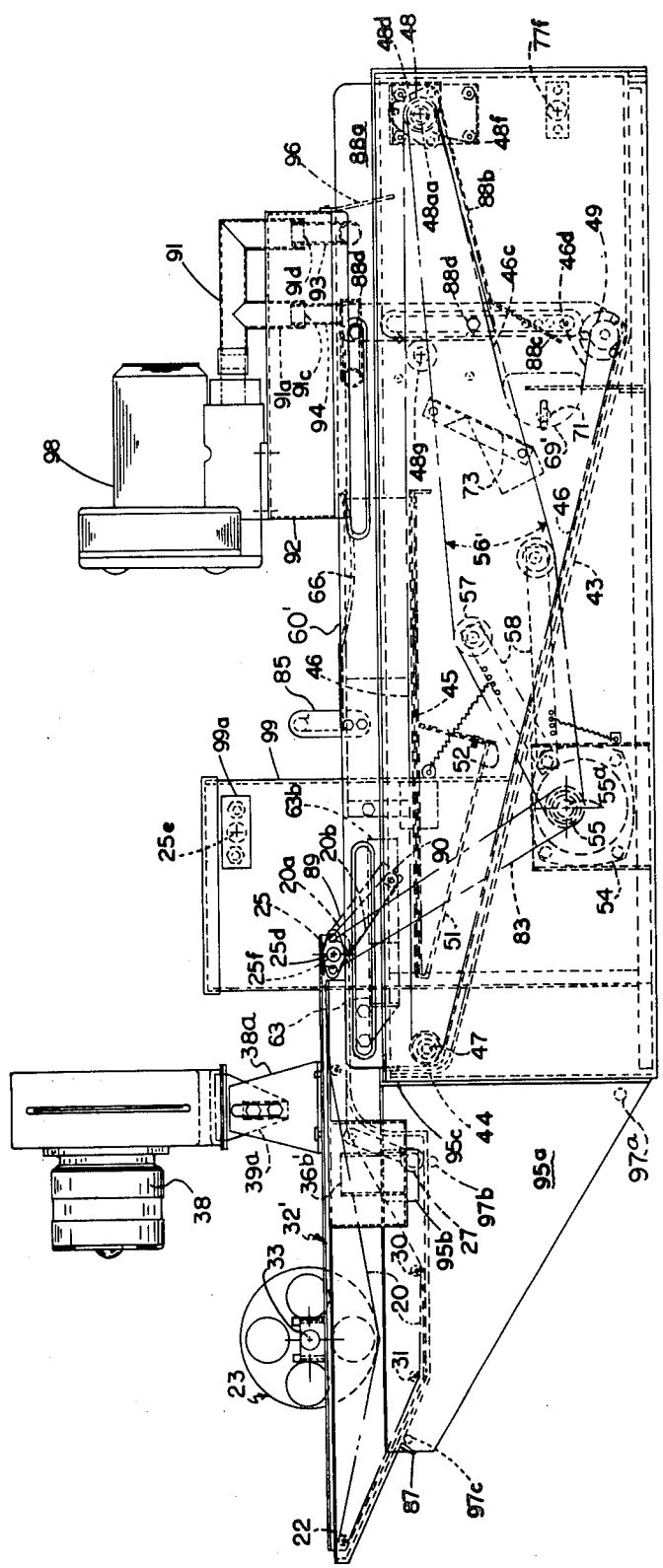
FIG. 23 is a side elevational view of a third embodiment of the invention showing the liquid-coating unit removably supported at the in-feed end of a modified dry breading material coating unit.
Figure 24:
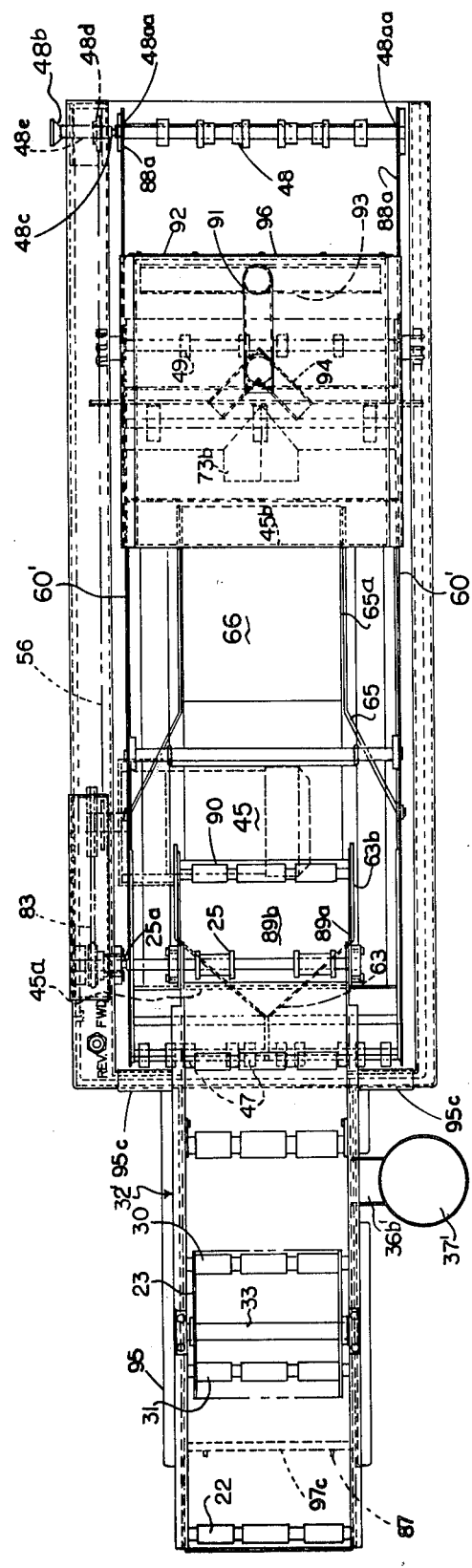
FIG. 24 is a top plan view of FIG. 23.

In the drawings, FIGS. 23, 24, 25, 27, 28, 29, 30, 31, 32 illustrate the parts additions necessary to convert from the preferred embodiment of FIG. 1 to the third embodiment in FIG. 23. Not shown in FIGS. 23, 24, 25, are 76, 77, 78, 80, 81, 82. These are the assembly parts for the take-away conveyor used in FIG. 1 and FIG. 20 and are not used in the embodiment of FIG. 23.

FIG. 26 shows a second possible configuration for the vertical conveyor support plate 60' on either side of the breading unit conveyor 46. It is quite similar to that shown at 60 in FIG. 4. The main exception being that the bottom edge of plate 60' in FIG. 26 is a straight line between the areas 47a and 49a. This line matches the line of the bread hopper bottom wall 43. The plates 60' in FIG. 26 now become the side walls of the bread reserve volume 42, and also the side walls of pumping slot 50. FIG. 15 is substantially unchanged when the side panels of FIG. 26 are used in place of those from FIG. 4.

FIG. 33 serves to show how the product must flip from the batter section to the breading layer, and from the breading belt to the take-away conveyor, all as in the preferred embodiment of FIG. 1.

FIG. 34 serves to show how the product is gently transferred from the batter section to the breading layer, and then flipped from the breading belt to the conveyor as in the second embodiment of FIG. 20.

FIG. 35 serves to show how the product is gently transferred from the batter section to the breading layer, and then moves on a level path until it leaves the machine, thus avoiding all flips, in the third embodiment as shown in FIG. 23.

The tamper plate 66 could be removed, it could be weighted, or a pressure roll could be substituted. The effect would be to vary the packing of the breading onto and around the product when it is between the side plow trailing legs 65a.

The configuration of side plows 65 might be considerably changed, without altering their function A more complex shape defeats one of the parameters of the machine, which is low cost. The side plows may be completely removed when only the bottom side of the product is to be dry coated.

The take-away conveyor location in FIG. 1 or FIG. 20 could be changed considerably without real effect except if it were raised to the level of the breading belt, thus eliminating the flip. This arrangement would be less satisfactory than that shown in FIG. 23.

What is claimed is:

1. The method of coating a food product with a finely divided particulate coating material comprising the steps of (1) providing a liquid coating on the food product; (2) providing a flow of said coating material to a moving belt which provides a product path centrally thereof; (3) splitting said flow and providing a bed of said material of predetermined thickness on a central portion of said product path while diverting parts of said material flow laterally on both sides of said central portion; (4) placing a food product on said central portion; (5) advancing said product and said coating material down said path; (6) moving said laterally diverted parts of material flow laterally inwardly on top of said food product; (7) discharging said coated product at the end of said path.

2. The method of claim 1 including the additional steps between (6) and (7) of (6a) tamping said coating material on top of and around said product; and (6b) assisting excess of said coating material under and around said product to return to circulation.

3. The method of coating a food product with a finely divided particulate coating material as defined in claim 1, including the preliminary step of providing a flow of said coating material to said moving belt which includes moving said coating material from a storage hopper by a moving open mesh wire belt pumping said material through a restricted slot and pushing said material upwardly through said moving belt which is of open wire mesh.

* * * * *